US008671277B2

(12) United States Patent
Xu et al.

(10) Patent No.: US 8,671,277 B2
(45) Date of Patent: Mar. 11, 2014

(54) METHOD FOR SECURE COMMUNICATION OVER HETEROGENEOUS NETWORKS

(75) Inventors: Jin Xu, Bellevu, WA (US); Biao Chen, Jamesville, NY (US)

(73) Assignee: Syracuse University, Syracuse, NY (US)

( * ) Notice: Subject to any disclaimer, the term of this patent is extended or adjusted under 35 U.S.C. 154(b) by 342 days.

(21) Appl. No.: 12/797,409

(22) Filed: Jun. 9, 2010

(65) Prior Publication Data

US 2010/0313021 A1 Dec. 9, 2010

Related U.S. Application Data

(60) Provisional application No. 61/185,434, filed on Jun. 9, 2009.

(51) Int. Cl.
*H04L 9/32* (2006.01)

(52) U.S. Cl.
USPC .............................. 713/168; 380/37; 380/46

(58) Field of Classification Search
USPC ........................................................ 713/168
See application file for complete search history.

(56) References Cited

U.S. PATENT DOCUMENTS

| 3,796,830 A * | 3/1974 | Smith .............................. 380/37 |
| 4,004,089 A * | 1/1977 | Richard et al. .................. 380/46 |
| 4,255,811 A * | 3/1981 | Adler ............................. 380/37 |
| 7,188,328 B2 | 3/2007 | Sharma et al. |
| 7,327,676 B2 | 2/2008 | Teruhi et al. |
| 7,397,761 B2 | 7/2008 | Kar et al. |
| 2004/0049595 A1 | 3/2004 | Sun et al. |
| 2005/0036486 A1 | 2/2005 | Sahinoglu et al. |
| 2007/0280233 A1 | 12/2007 | Bush |
| 2008/0317056 A1 | 12/2008 | Curtis et al. |
| 2009/0003238 A1 | 1/2009 | Denby et al. |
| 2009/0073876 A1 | 3/2009 | Kimmich et al. |

OTHER PUBLICATIONS

T. Bheemarjuna Reddy, S. Sriram, B.S. Manoj, C. Siva Ram Murthy, MuSeQoR: Multi-path failure-tolerant security-aware QoS routing in Ad hoc wireless networks, Computer Networks, vol. 50, Issue 9, Jun. 20, 2006, pp. 1349-1383, ISSN 1389-1286.*

(Continued)

*Primary Examiner* — Carl Colin
*Assistant Examiner* — Syed Zaidi
(74) *Attorney, Agent, or Firm* — Jennifer M. Crisp, Esq.; Matthew M. Hulihan, Esq.; Heslin Rothenberg Farley & Mesiti P.C.

(57) ABSTRACT

A method for securely communicating a message from a source node to a destination node over a network can comprise the steps of converting the message into an initial bit sequence, pre-processing the initial bit sequence by a modulo adding the initial bit sequence with an auxiliary key message, constructing a reduced network, determining a multitude of paths from the source node to the destination node over the reduced network, constructing an expanded bit sequence comprising the initial bit sequence and the auxiliary key message, splitting the expanded bit sequence into two or more parts, transmitting the two or more parts of the expanded bit sequence over two or more paths of the multitude of paths, re-assembling the two or more parts of the expanded bit sequence at the destination node, and recovering the initial bit sequence by modulo adding the expanded bit sequence with the auxiliary key message.

20 Claims, 13 Drawing Sheets

(56) References Cited

OTHER PUBLICATIONS

Zeng X.; Bagrodia, R.; Gerla, M.; , "GloMoSim: a library for parallel simulation of large-scale wireless networks," Parallel and Distributed Simulation, 1998. PADS 98. Proceedings. Twelfth Workshop on , vol., no., pp. 154-161, May 26-29, 1998.*

Jiangtao Wen; Hyungjin Kim; Villasenor, J.D.; , "Binary arithmetic coding with key-based interval splitting," Signal Processing Letters, IEEE , vol. 13, No. 2, pp. 69-72, Feb. 2006.*

Bose, Prosenjit, et al. "Routing with guaranteed delivery in ad hoc wireless networks." Wireless Networks 7.6 (2001): 609-616.*

Xu, J., & Chen, B. (Nov. 2008). On secure multi-channel communication systems. In Military Communications Conference, 2008. MILCOM 2008. IEEE (pp. 1-7). IEEE.*

C.E. Shannon, "Communication Theory of Secrecy Systems", Bell System Technical Journal, vol. 28-4, pp. 656-715, Oct. 1949.

Vaneet Aggarwal, Lalitha Sankar, A. Robert Calderbank, and H. Vincent Poor, "Secrecy Capacity of a Class of Orthogonal Relay Eavesdropper Channels", Jun. 8, 2009.

Ford, L.R. and Fulkerson, D.R., "Maximal Flow Through a Network", Canadian Journal of Mathematics, 8:399-404, 1956.

* cited by examiner

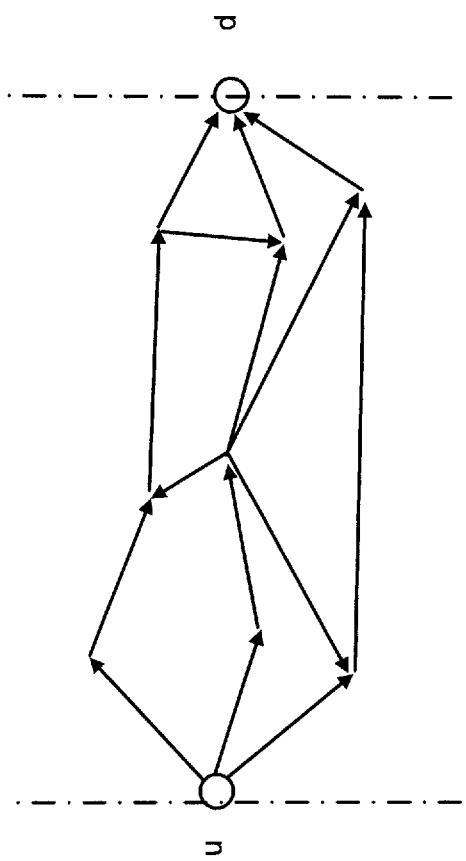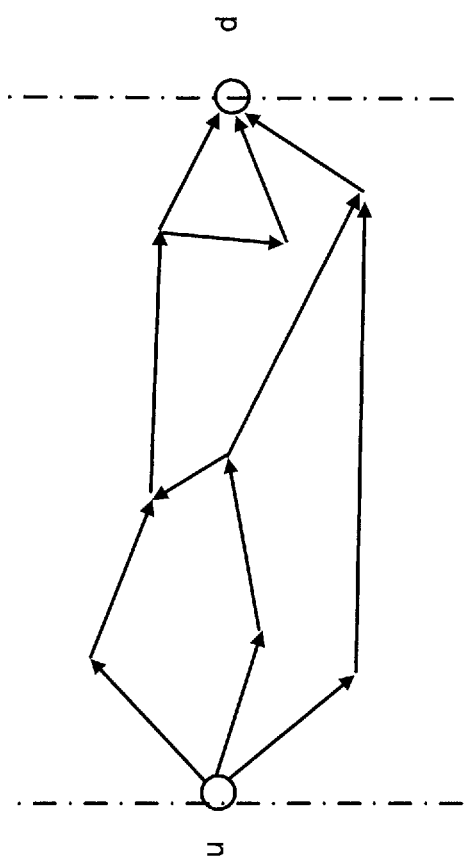

METHOD FOR SECURE COMMUNICATION OVER HETEROGENEOUS NETWORKS

CROSS-REFERENCE TO RELATED APPLICATIONS

This application claims priority under 35 U.S.0 §119(e) to U.S. Provisional Patent Application No. 61/185,434 filed Jun. 9, 2009 entitled, "Encoding, Decoding And Network Protocol Design For Secure Communication Over Wireline And Wireless Networks," the content of which is incorporated herein by reference.

STATEMENT REGARDING FEDERALLY SPONSORED RESEARCH AND DEVELOPMENT

This invention was made, in part, with government support under award numbers 0501534, awarded by the National Science Foundation (NSF) and FA8750-05-2-0120, awarded by the United States Air Force Research Laboratory (AFRL). Accordingly, the United States Government may have certain rights in the invention.

FIELD OF THE INVENTION

This invention relates to computer network communication methodologies generally, and in particular, to secure communication protocols for computer networks.

BACKGROUND OF THE INVENTION

Communication networks are ubiquitous nowadays, and in particular, data networks (e.g., Internet) are becoming increasingly integrated in our day to day life. Maintaining the integrity of information flowing over networks is of critical importance for both privacy and national security reasons. Most existing networks, both commercial and military, have already integrated various data protection measures. At the heart of every existing security technology, the data protection relies highly on the public key/private key infrastructure (e.g., RSA) developed since 1970s for computer networks.

According to information theory, for the traditional key based encryption scheme, perfect secrecy is guaranteed only if a key size is at least as long as the source message. While providing a key size at least as long as a source message establishes provable security of the so-called one-time pad, such scheme is largely useless in the computer network era as key exchange is prohibitively complex.

SUMMARY OF THE INVENTION

There is provided a method for securely communicating a message from a source node to a destination node over a network. The method can comprise the steps of: converting the message into an initial bit sequence, pre-processing the initial bit sequence by a modulo adding the initial bit sequence with an auxiliary key message, constructing a reduced network, determining a multitude of paths from the source node to the destination node over the reduced network, constructing an expanded bit sequence comprising the initial bit sequence and the auxiliary key message, splitting the expanded bit sequence into two or more parts, transmitting the two or more parts of the expanded bit sequence over two or more paths of the multitude of paths, re-assembling the two or more parts of the expanded bit sequence at the destination node, and recovering the initial bit sequence by modulo adding the expanded bit sequence with the auxiliary key message.

BRIEF DESCRIPTION OF THE DRAWINGS

FIG. 10 shows a diagram illustrating a plane graph;

FIG. 11 shows a diagram illustrating a reduced network;

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
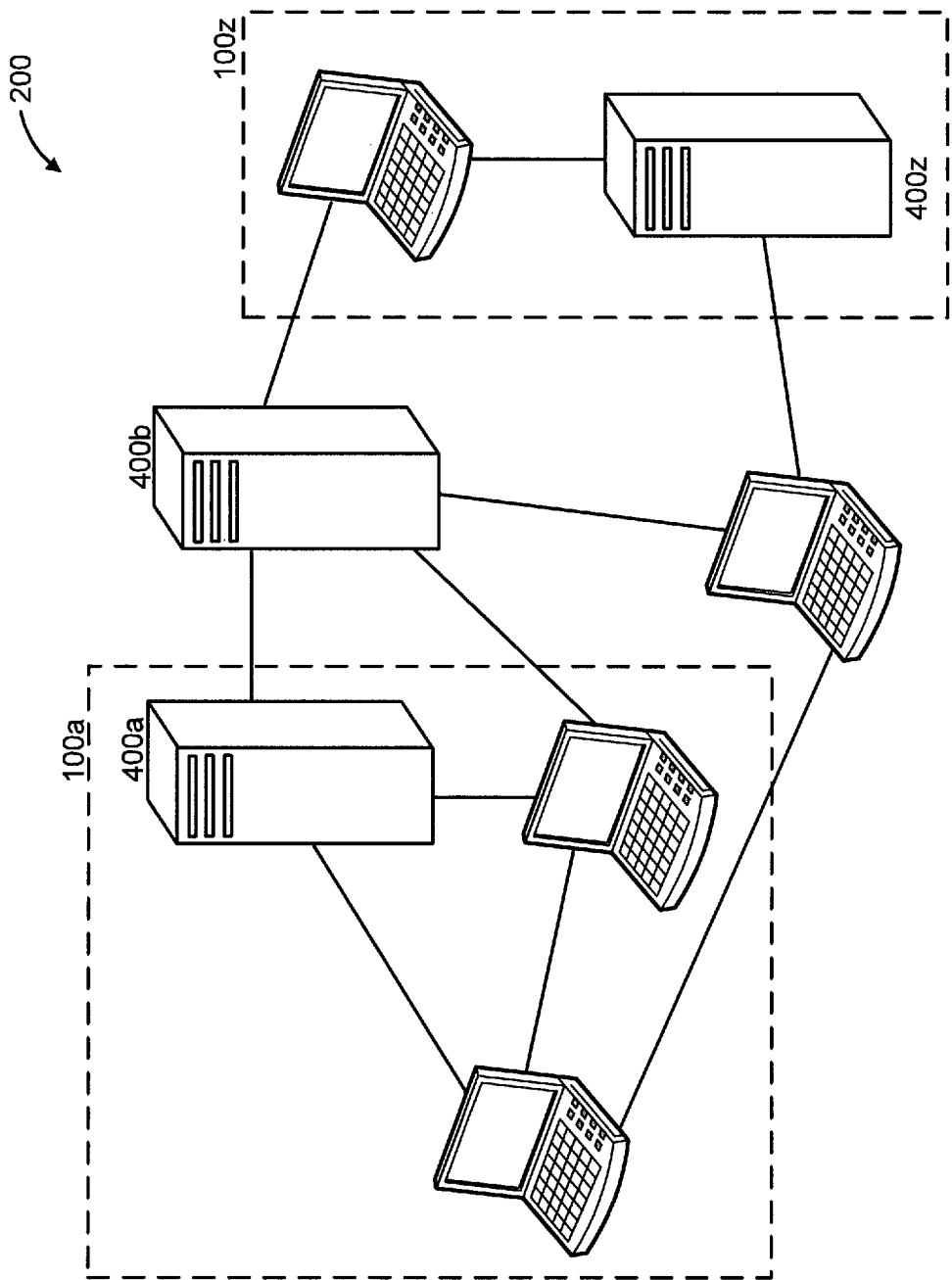
FIG. 1 illustrates an example of a heterogeneous communication network.

There is provided a method for securely communicating messages over heterogeneous networks. FIG. 1 illustrates an example of a heterogeneous network. The heterogeneous network 1000 can include zero or more local area networks (LAN) 100a-100z, zero or more wide area networks (WAN) 200, and zero or more virtual private networks (VPN), together with any routing equipment (routers) 400a-400z necessary to establish the inter-network connectivity. A LAN can be provided by a wired (e.g., Ethernet) or a wireless (e.g., IEEE 802.11-compatible) network. A WAN can be provided by a wired (e.g., Gigabit Ethernet) or a wireless (e.g., GPRS) network. A VPN can be provided by a software running over wired and/or wireless networks.

In one aspect, each of the LANs, WANs, and VPNs can comprise two or more interconnected computers. A "computer" herein shall refer to a programmable device for data processing which includes a central processing unit (CPU), a memory, and at least one communication interface. A computer can be provided, e.g., by a server, a router interconnecting two or more networks, a personal computer, or a mobile computing device such as a GPRS-enabled personal communicator. A skilled artisan would appreciate the fact that other types of programmable devices for data processing which include a central processing unit (CPU), a memory, and at least one communication interface are within the spirit and the scope of the invention.

Figure 2:
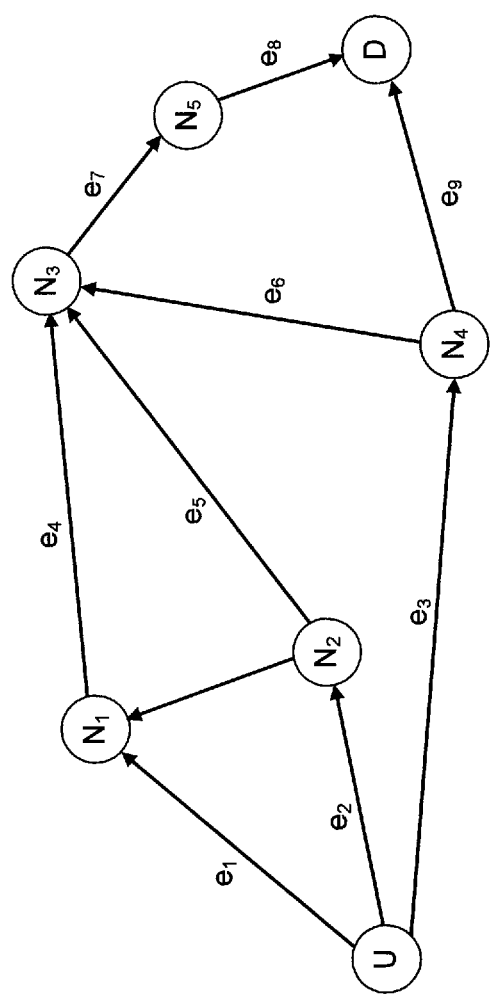
FIG. 2 illustrates a representation of a heterogeneous communication network by a directed graph.

In another aspect, a heterogeneous communication network can be represented by a directed graph G=(V,E) comprising a plurality of nodes V interconnected by a plurality of edges E as shown in FIG. 2. Each node v can have a set of edges flowing into it and a set of edges flowing out of it, referred to as In(v) and Out(v) respectively. Each edge can be characterized by a throughput, or capacity $C_i$.

The communication network represented by a graph G can include a source node u and a destination node d. A message can be encoded and node u, then transmitted via Out(u)—the set of edges flowing out of the node u, further transmitted by other edges, and finally transmitted via In(d)—the set of edges flowing to the node d to the node d where it can be successfully decoded. The communication network can include one or more paths from the source node u to the destination node d.

Each link in the network (represented by an edge of graph G) can be subject to eavesdropping, which means that a third party (which is not an intended recipient of the communication) can obtain a verbatim copy of information transmitted over a specific link. In one aspect, the network can be subject to a non-cooperative eavesdropping, i.e., two or more third parties can eavesdrop on two or more links within the network, but the third parties do not share the information they obtained by eavesdropping. In a further aspect, a single third party can eavesdrop on two or more links within the network.

In a further aspect, the graph representing a heterogeneous communication network can be a plane graph, i.e., it can be drawn in a single plane in such a way that its edges intersect only at their nodes. In a yet further aspect, the graph can be bounded, i.e., the source node and the destination node can be placed on its left and right ends respectively.

As noted earlier, a communication network can include multiple paths from the source to the destination. According to the invention, the path diversity can be relied upon for securely transmitting a message from the source to the destination. A message can be split in two or more parts, each of the parts can be transmitted by a network path to the destination where the message can be re-assembled by the recipient, while a third party eavesdropping on any single link will not be able to re-construct the message being transmitted.

The prior art key encryption technology needs to have a common private key (most likely generated from a public key) available a priori to both the sender and the receiver. According to the invention, however, a key can be generated by the sender, which can modulo add the key to the message bit sequence. Then the key and the resulting bit sequence can be transmitted over the network, by splitting the expanded bit sequence (comprising the key and the modulo added bit sequence) into two or more parts which then can be transmitted through two or more paths.

Figure 3:
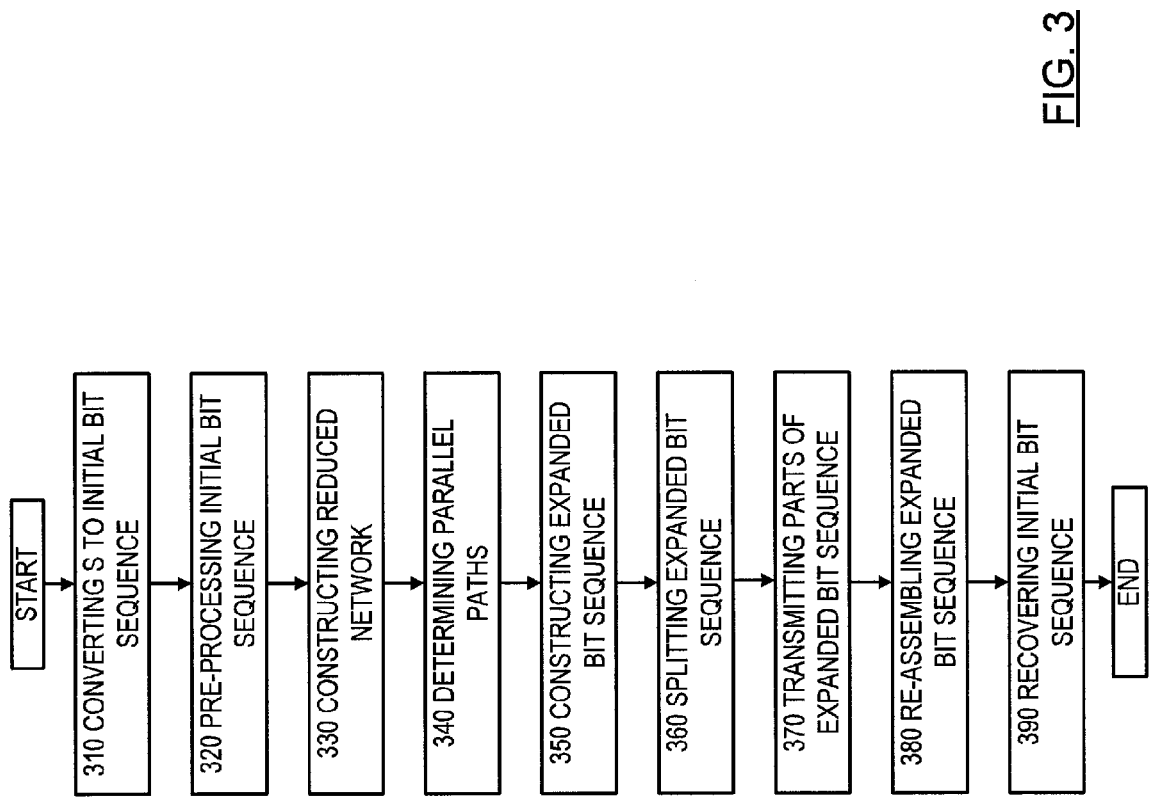
FIG. 3 illustrates a flow diagram of a sample implementation of the method of securely transmitting a message over a communication network.

FIG. 3 illustrates a flow diagram of a sample implementation of the method of securely transmitting a message over a communication network. In one embodiment, the method can be performed by a plurality of interconnected computers composing a computer network.

At step 310, a message S can be converted into an initial bit sequence $b_1, b_2, \ldots, b_n$, where the bits are assumed to be independently and identically distributed. In one embodiment, step 310 can be performed by a computer. In another embodiment, step 310 can be performed by a group of computers comprising two or more interconnected computers.

At step 320, the initial bit sequence can be pre-processed by modulo adding with an auxiliary key message. In one embodiment, the auxiliary key message can be provided by a bit sequence serving as a key. In one embodiment, the auxiliary key message K can be randomly generated by the sender. A skilled artisan would appreciate the fact that other ways of generating the key message K are within the spirit and the scope of the invention.

In one embodiment, step 320 can be performed by a computer. In another embodiment, step 320 can be performed by a group of computers comprising two or more interconnected computers. In a yet another embodiment, step 320 can be performed by the same computer or by the same group of interconnected computers which perform step 310.

At step 330, a reduced network can be constructed. In one aspect, this step can be performed by identifying a multitude of paths achieving the maximum flow over the network, as described in details herein infra with references to FIG. 4. In one embodiment, step 330 can be performed by a computer. In another embodiment, step 330 can be performed by a group of computers comprising two or more interconnected computers. In a yet another embodiment, step 330 can be performed by the same computer or by the same group of interconnected computers which perform step 320. At step 340, a multitude of paths over the reduced network from the source node to the destination node can be determined, as described in details herein infra with references to FIG. 5. In one embodiment, step 340 can be performed by a computer. In another embodiment, step 340 can be performed by a group of computers comprising two or more interconnected computers. In a yet another embodiment, step 340 can be performed by the same computer or by the same group of interconnected computers which perform step 330.

At step 350, an expanded bit sequence can be constructed. The expanded bit sequence can comprise the initial bit sequence and the auxiliary key message. In one embodiment, step 350 can be performed by a computer. In another embodiment, step 350 can be performed by a group of computers comprising two or more interconnected computers. In a yet another embodiment, step 350 can be performed by the same computer or by the same group of interconnected computers which perform step 340.

At step 360, the expanded bit sequence can be split into two or more parts. In one embodiment, the expanded bit sequence can be split into two or more parts of a pre-defined size. In another embodiment, the expanded bit sequence can be split into two or more parts of a randomly selected size. A skilled artisan would appreciate the fact that other methods of splitting the expanded bit sequence into two or more parts are within the scope and the spirit of the invention.

In one embodiment, step 360 can be performed by a computer. In another embodiment, step 360 can be performed by a group of computers comprising two or more interconnected computers. In a yet another embodiment, step 360 can be performed by the same computer or by the same group of interconnected computers which perform step 350.

At step 370, the parts of the expanded bit sequence can be transmitted over the identified multitude of paths. In one embodiment, each part of the expanded bit sequence can be successively assigned to the identified multitude of paths.

In one embodiment, step 370 can be performed by a computer. In another embodiment, step 370 can be performed by a group of computers comprising two or more interconnected computers. In a yet another embodiment, step 370 can be performed by the same computer or by the same group of interconnected computers which perform step 360.

At step 380, the parts of the expanded bit sequence can be re-assembled at the destination node. In one embodiment, step 380 can be performed by a computer. In another embodiment, step 380 can be performed by a group of computers comprising two or more interconnected computers.

At step 390, the initial bit sequence can be recovered by modulo adding the expanded bit sequence with the auxiliary key message. In one embodiment, step 390 can be performed by a computer. In another embodiment, step 390 can be performed by a group of computers comprising two or more interconnected computers. In a yet another embodiment, step 390 can be performed by the same computer or by the same group of interconnected computers which perform step 380.

The method can terminate after the message S is successfully recovered at the destination node.

In one embodiment, steps 310-370 can be performed by a group of one or more interconnected computers, and steps 380 and 390 can be performed by another group of one or more interconnected computers. In another embodiment, steps 310-370 can be performed by one computer, and steps 380 and 390 can be performed by another computer, both computers being interconnected by the same computer network.

Figure 4:
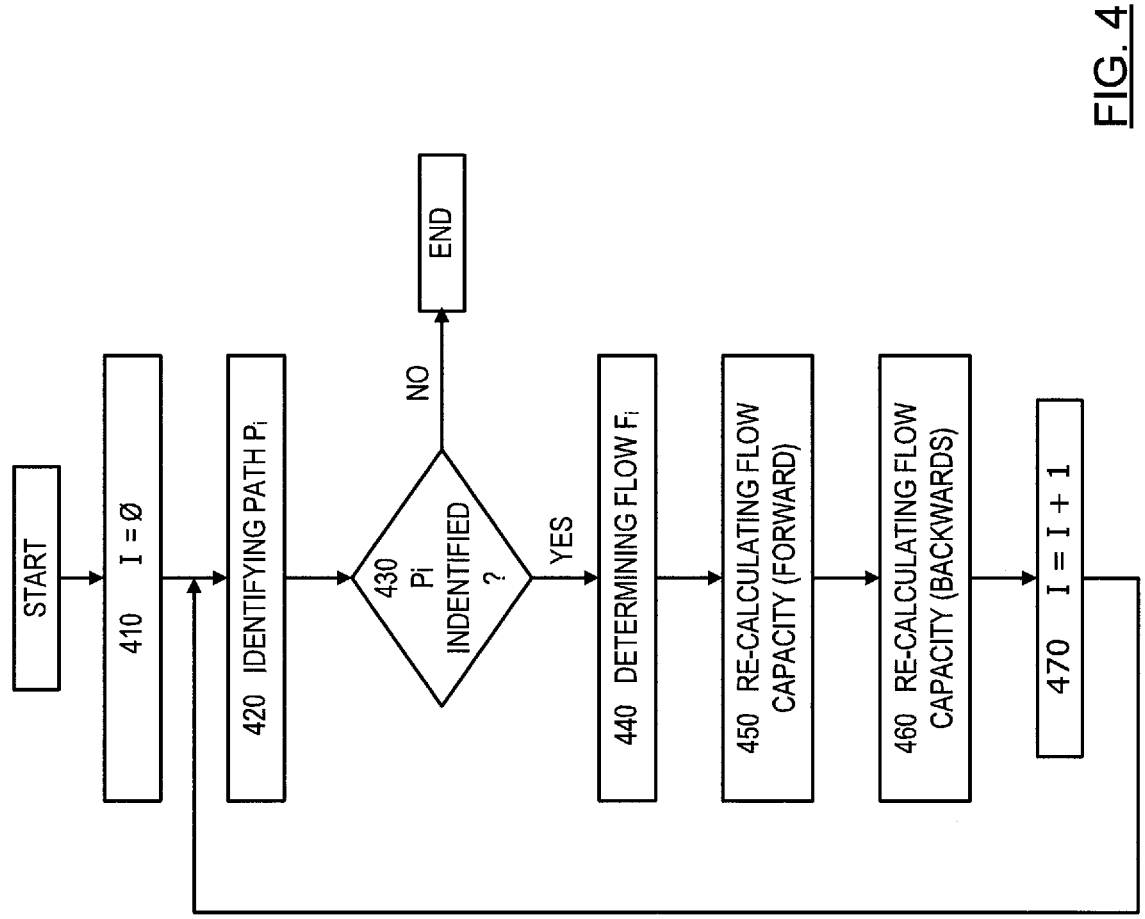
FIG. 4 illustrates a flow diagram of a sample implementation of the method of constructing a reduced network.
Figure 5:
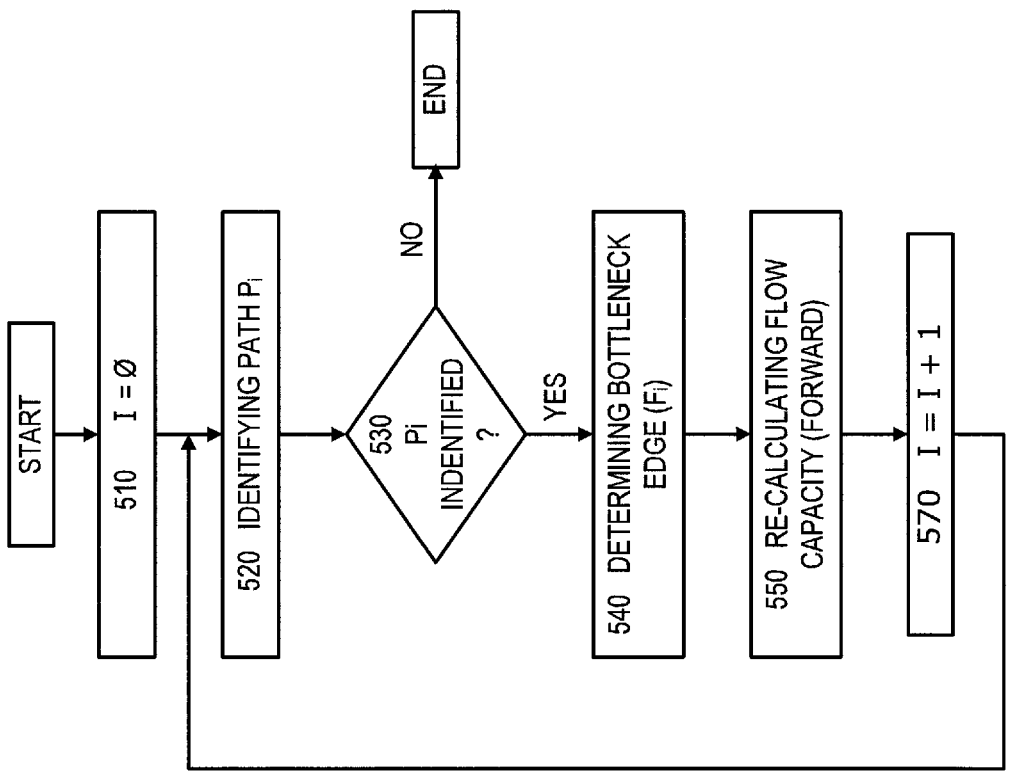
FIG. 5 illustrates a flow diagram of a sample implementation of the method of identifying a multitude of paths over the reduced network.
Figure 6:
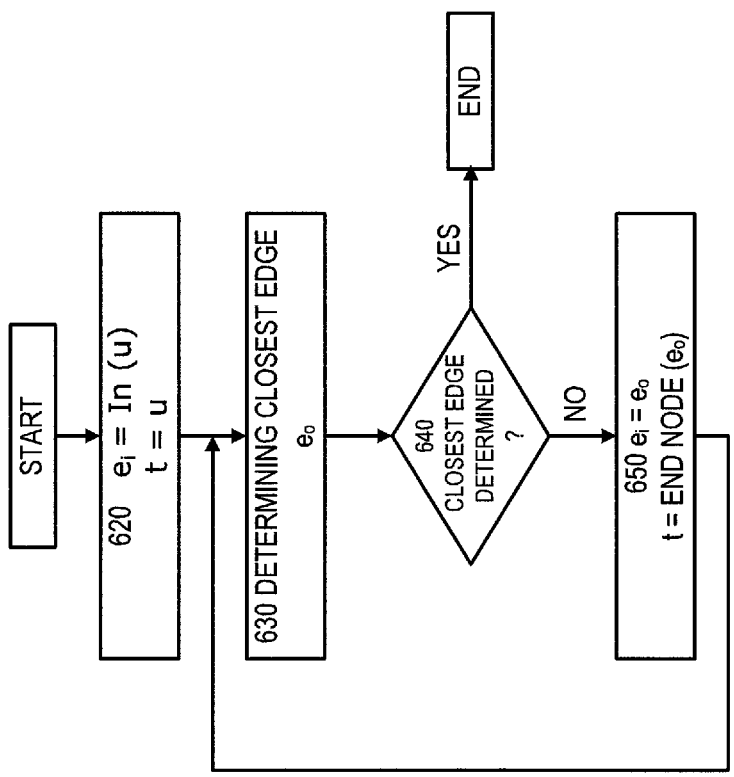
FIG. 6 illustrates a flow diagram of a sample implementation of the method of identifying a highest path.

Sample embodiments of auxiliary methods are now being described with references to FIGS. 4-6.

FIG. 4 illustrates a flow diagram of a sample implementation of the method of constructing a reduced network.

In a directed graph G, a path is a sequence of edges ($e_1$, $e_2$, ... $e_i$) such that $e_1 \in \text{Out}(u)$, $e_i \in \text{In}(d)$, and for $0 < i < l$ there exist $t_i \in V$ such that $e_i \in \text{In}(t_i)$ and $e_{i+1} \in \text{Out}(t_i)$. A path has a flow amount f if each edge of this path has flow amount f.

At step 410, the counter of identified paths i is initialized with a value of 0.

At step 420, i-th path from the source node to the destination node which has a strictly positive flow capacity remaining, is identified. At step 430, the method verifies whether the i-th path was successfully determined. If there are no such paths, the method of constructing a reduced network terminates.

At step 440, the maximum flow f, along the i-th path is determined as being equal to the smallest flow on any edge in the path (the bottleneck edge).

At step 450, the value of f, is subtracted from the remaining flow capacity in the forward direction for each edge in the path.

At step 460, the value of f, is added to the remaining flow capacity in the backwards direction for each edge in the path.

At step 470, the value of the counter of identified paths i is incremented by 1, and the method cycles back to step 420.

As noted herein supra, the method of constructing a reduced network terminates when no path from the source node to the destination node can be identified which has a strictly positive flow capacity remaining The reduced network comprises all the paths identified.

FIG. 5 illustrates a flow diagram of a sample implementation of the method of identifying a multitude of paths over the reduced network.

At step 510, the counter of identified paths i is initialized with a value of 0.

At step 520, i-th path from the source node to the destination node is identified as the highest path from the source node to the destination node, as described in details herein infra with references to FIG. 6. At step 530, the method verifies whether the i-th path was successfully determined. If there are no such paths, the method of identifying a multitude of paths over the reduced network terminates.

At step 540, the maximum flow f, along the i-th path is determined as being equal to the smallest flow on any edge in the path (the bottleneck edge).

At step 550, the value of f, is subtracted from the remaining flow capacity in the forward direction for each edge in the path.

At step 570, the value of the counter of identified paths i is incremented by 1, and the method cycles back to step 520.

As noted herein supra, the method of identifying a multitude of paths over the reduced network terminates when no path from the source node to the destination node can be identified which has a strictly positive flow capacity remaining.

Figure 7:
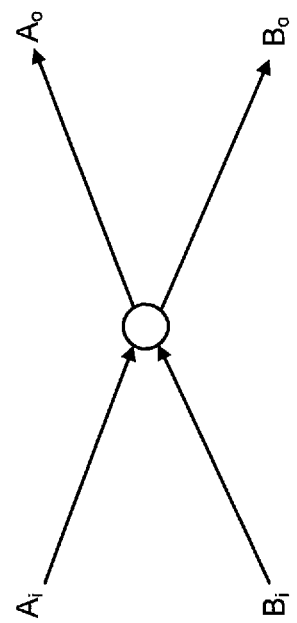
FIG. 7 illustrates a definition of a higher path in a communication network.

FIG. 6 illustrates a flow diagram of a sample implementation of the method of identifying a highest path. By definition, path A is higher than path B if for any node t shared by A, B, the input and output edges of A, B at node t are clockwise ordered as $\{A_i, A_O, B_O, B_i\}$ as shown in FIG. 7.

At step 620, the virtual edge $e_i$ is initialized with a value of any edge from In(u), and node t is initialized with the value of the source node u.

At step 630, an output edge $e_O$ from the edge set Out(t) which is the closest to the edge $e_i$ is identified according to the clockwise order at node t.

At step 640, verifies whether the edge $e_O$ can be found in Out(d) and successfully terminates if the verification succeeds. Otherwise, at step 650 the variable $e_i$ is assigned the value $e_O$, the variable t is assigned the value of the end node of the edge $e_O$, and the method cycles back to step 630.

[The following section is an excerpt of U.S. Provisional Patent Application No. 61/185,434 with minor formatting and editorial changes].

This invention relates to computer network communication methodologies generally, and in particular, to secure communication protocols for computer networks.

Communication networks are ubiquitous nowadays, and in particular, data networks (e.g., Internet) are becoming increasingly integrated in our day to day life. Maintaining the integrity of information flowing over networks is of critical importance for both privacy and national security reasons. Most existing networks, both commercial and military, have already integrated various data protection measures. At the heart of every existing security technology, the data protection relies highly on the public key/private key infrastructure (e.g., RSA) developed since 1970s for computer networks.

According to theory, perfect secrecy is guaranteed only if a key size is at least as long as the source message. While providing a key size at least as long as a source range establishes provable security of the so-called one-time pad, such scheme is largely useless in the computer network era as key exchange is prohibitively complex.

According to a security share methodology set forth herein route diversity can be exploited in a network providing multiple independent routes to a destination allows a sender to encode a message in a way such that eavesdropping on a single link will not result in breach of security.

There is set forth in one embodiment a method for secure communication over networks where each link or node is subject to non-cooperative eavesdropping. The method can include the design of encoding, decoding, and bit routing for communication over a network, comprising the steps of: (a) Manipulating the messages bits by modulo addition; and (b) constructing the virtual parallel path set of the network for bits transmission.

There is further set forth in one embodiment a system consisting of interconnected nodes in which two nodes need to communicate securely with each other via other nodes that serve as relays in the presence of an eavesdropper at an unknown location.

There is further set forth in one embodiment a method for secure and reliable communication when the links are subject to eavesdropping or outage or byzantine threat.

There is further set forth in one embodiment a system consisting of interconnected nodes in which two nodes need to communicate with each other securely and reliably via other nodes that serve as relays in the presence of an eavesdropper at an unknown location and/or link outage and/or byzantine nodes.

There is further set forth in one embodiment a distributed storage or secret sharing system in which each storage unit or trustee is subject to wiretapping or theft threat.

Further details of encoding, decoding, and network protocol design for secure communication over wireline and wireless networks in one embodiment are set forth herein.

This invention provides a design of secure network where the communication occurs between one sender and one receiver. Against eavesdropping or active threat in the network with unknown location, the proposed design approach ensures security and optimizes throughput in the meantime. In addition, the design approach is operative to protect distributed data storage and other similar systems against possible compromise of one or more nodes.

Communication networks are ubiquitous nowadays, and in particular, data networks (e.g., Internet) are becoming increasingly integrated in our day to day life. Maintaining the integrity of information flowing over networks is of critical importance for both privacy and national security reasons. Most existing networks, including commercial and military, have already integrated various data protection measures. At the heart of every existing security technology, the data protection relies highly on the public key/private key infrastructure (e.g., RSA) developed since the 1970s for computer networks.

On the theoretical level, it is also not surprising that existing security schemes are largely based upon the complexity of certain computational problems. One can trace it back to C. E. Shannon's seminal work in 1949, *Communication Theory of Secrecy Systems*. A Shannon Cipher System, as described in FIG. 8, involves two communicating parties (Bob and Alice) and an eavesdropper (Eve). A private key, K, is shared by Bob and Alice that is completely unknown to Eve. Bob uses K to encrypt the secret message S into ciphertext X while Alice uses K to decrypt X back to S.

Figure 8:
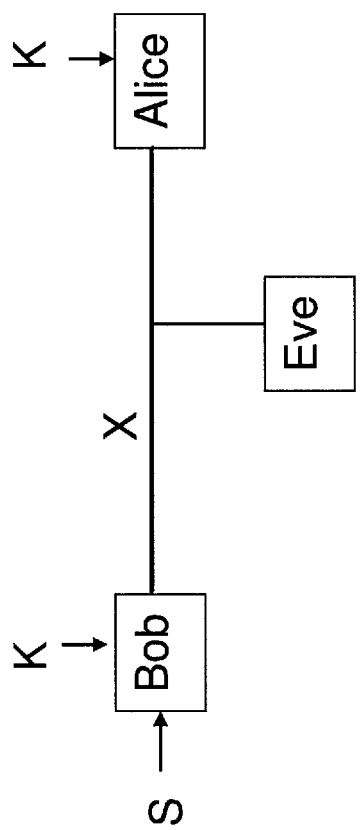
FIG. 8 shows a diagram illustrating a Shannon Cipher system.

In FIG. 8 there is shown a diagram illustrating a Shannon Cipher system.

Define S, K, X to be random variable with distribution P(.). In information theoretic terms, perfect secrecy is achieved when H(S|X)=H(S) but H(S|X,K)=0 where $$H(x) = -\sum_x p(x)\log p(x)$$

is the usual Shannon entropy function that measures uncertainty associated with the random variable. Thus, given X alone, Eve gains no information about S, while if both X and K are given (as for Alice), S can be completely recovered. Using the information theoretic argument, Shannon established a somewhat surprising result. Perfect secrecy is guaranteed only if H(K)>H(S), i.e., the key size is at least as long as the source message. While this establishes provable security of the so-called one-time pad, such scheme is largely useless in the computer network era as key exchange is prohibitively complex.

1.0 INTRODUCTION

Our goal is to take a holistic approach over the network design, to obtain security as well as the reliability and throughput of network communication. This integrated approach is expected to provide a new design paradigm that utilizes the structure of the network and potentially improve the current layered network design. The basic idea is to exploit the route diversity in a network. Providing multiple independent routes to the destination allows the sender to encode the message in a way such that for an adversary that eavesdrops on a single link, it will gain no information about what is transmitted. Consider for example that there are two parallel links each of capacity, C, bits/second. The simple scheme is to communicate a secret key on link 1 while using the key to encrypt the message on link 2. Eavesdropping on link 2 is protected because of the provable security of one-time pad. On the other hand, the eavesdropper on link 1 has only access to the key but not the encrypted message. Therefore the eavesdropper is also completely ignorant of the message. In the following, we describe the application of such principle to a communication network where the links are not necessarily parallel.

1.1 Description of the Model in the Invention

Figure 9:
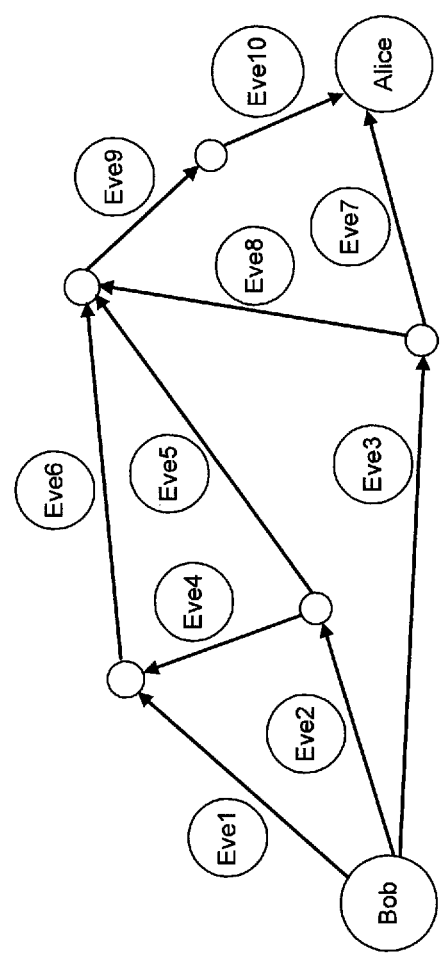
FIG. 9 shows a network with non-cooperating eavesdropping.

The basic model involved in the invention assumes any single-source single-sink acyclic network model, where a single source delivers information to a single sink through a network of nodes. Each link in the network is subject to non-cooperating eavesdropping. That is, we assume there is an eavesdropper trying to wiretap on a link within the network. The location of the eavesdropper is unknown to the communicating parties. Equivalently, we may assume each link is subject to wiretapping but the wire tappers do not share information. This basic model is illustrated in FIG. 9. We note that more complicated scenarios, e.g., eavesdropping on multiple links or nodes can also be dealt with using the proposed method.

In FIG. 9 there is shown a network with non-cooperating eavesdropping.

A. Problem Formulation

The above basic model consists of the following components:

1. Directed graph G: The pair G=(V, E) is called a directed graph, where V and E are the node set and the edge set of G, respectively. In our model, we assume that G is acyclic, i.e., it does not contain a directed cycle. Let Out(v) and In(v) be the sets of the edges flowing into and out of the node v, respectively. Assume each link has capacity Cio, (i, o)∈E.

2. Source and sink node u and d: The node set V contains a node u (called the source node) and d (called the sink node). The random messages S and T are encoded at node u and then transmitted via Out(u), and required to be reliably decoded at node d via In(d).

3. Wiretapping at each link in E: Each link in the network is subject to non-cooperating eavesdropping and any adversary can obtain a verbatim copy of the transmitted information over the specific link.

4. The performance metrics for the secure communication method involve the following rate triple $(R_c, R_p, R_{e,io})$, (i,o)∈E, defined as:

Definition 1: $(R_c, R_p, R_{e,io})$ is an achievable rate quadruple (as in bit per symbol) for the NSC system if and only if there exists encoder-decoder $(f_n, \phi)$ for the message sets $S_n, T_n$, such that $$\frac{1}{n}\log\|S_n\| = R_c;$$

$$\frac{1}{n}\log\|T\| = R_p;$$

$$\frac{1}{n}H(S_n \mid X_{io}^n) \geq R_{e,io};$$

where $H(S_n|X_{io}^n)$, $(i, o) \in E$ is evaluated under the assumption that the random messages $S_n, T_n$, are independent and uniformly distributed over their ranges. The set of all achievable rate quadruples will be denoted by R. If (Rc, Rp, Re, io)∈R, we say that Rc and Rp are achievable private and public message rates at equivocation rates $R_{e,io}$, $(i,o) \in E$, for this network.

Specifically, the physical meaning of the rate triple is as follows:

$R_c$: communication rate of the useful information over the network between the source and destination node.

$R_k$: The key rate. This key is communicated in real time along with the useful information through the network.

$R_{e,io}$: equivocation rate which is the measure of secrecy for the information with respect to the eavesdropper on link (i,o). When $R_c = R_{e,io}$, the information is completely protected against the eavesdropper on link (i,o).

The network under consideration is assumed to be a plane graph, which means the graph can be drawn on the plane in such a way that its edges intersect only at their nodes. This is the typical structure for communication networks that we encounter in real practice. In addition, the graph is bounded, i.e., the source node and sink node is in its left and right end respectively.

In FIG. 10 there is shown a diagram illustrating a plane graph.

B. Preliminary

In the absence of security requirement, the maximal network throughput is determined by the well-known Max-flow Min-cut theorem, which can be re-written as the following theorem:

Theorem 1: $(R_c, R_p)$, $(i,o) \in E$, is achievable iff $$R_c + R_p \leq \min_{cut} \sum_{(i,o) \in (IO)_{cut}^l} C_{io},$$

Where cut is defined as a valid cut of this network, which splits the node set V into two disjoint subsets: a source subset $U_{cut}$ and a sink subset $D_{cut}$, where $u \in U_{cut}$ and $d \in C_{cut}$. $(IO)_{cut}^l$ defined as the boundary link set for this given cut cut, where for $j=1, 2, \ldots, 1$, $\{(i,o)_{cut,j} \in (IO)_{cut}^l | (i,o)_{cut,j} \in E, i_{cut,j} \in U_{cut}, o_{cut,j} \in D_{cut}\}$ The max-flow min-cut theorem states: The maximum amount of flow is equal to the capacity of a minimal cut.

In this subsection, we first revisit Ford and Fulkerson's method which was used to prove the achievability of maxflow min-cut theorem. The key to the proposed design approach is a suitable modification of Ford-Fulkerson's method to ensure security while maximizing throughput.

Definition 2: In a directed graph G, a Path is a sequence of edges $\{e_1, e_2, \ldots, e_l\}$ such that $e1 \in Out(u)$, $e1 \in In(d)$, and for $0 < i < l$ there exist $ti \in V$ such that $ei \in In(t_i)$ and $e_{i+1} \in Out(t_i)$.

Definition 3: Two paths share an edge or node if this edge or node is contained by two paths. Two paths are different if one path contains no less than one edge that is not shared by the other path. A path with flow amount f is defined as a path wherein each edge of the path has flow f and thus an information flow with amount f goes through a pipeline path from u to d.

Ford and Fulkerson's solution.

(0) i=1.

(1) Find any path from the source node to the sink node that has a strictly positive flow capacity remaining. If there are no more paths, exit.

(2) Determine $f_i$. The maximum flow along this path, which will be equal to the smallest flow amount on any edge in the path (the bottleneck edge).

(3) Store this path as Path$_i$ with flow amount $f_i$.

(4) Subtract $f_i$ from the remaining flow capacity in the forward direction for each edge in the path. Add $f_i$ to the remaining flow capacity in the backwards direction for each edge in the path.

(5) set i=i+1. Go to step (1).

On termination, the sum of the flows along the paths found during Step (1) gives the maximum total flow between the source and sink nodes. This path set constructs what we call a reduced network, as illustrated in FIG. 11. It has the properties listed below:

The graph of the reduced network is the same as that of the original network except possibly that some of the edges of the original network are missing (0 flow amount).

Each edge in the reduced network has a flow amount equal to or less than the corresponding edge of the original network.

The sum flow amounts of the input and output edges of any node in the reduced network are equal.

Any edge in the reduced network is in at least one cut-set of min-cut value.

In FIG. 11 there is shown a diagram illustrating a reduced network.

1.2 Further Detailed Description

In this section, we propose our approach for secure communication for the model described in Section 1.1.

A. Summarization of Proposed Approach

The proposed approach to achieve security via a network is summarized as follows:

Convert the uniform distributed messages S and T into binary bit sequences $b_1, b_2, \ldots b_{nR_c}$ and $k_1, k_2, k_{nR_c}$, where we assume each bit is i.i.d. Bernoulli(½).

Pre-process the confidential and public message bits by modulo addition operator.

Find the path sets achieving max-flow, and then construct the reduced network.

(0) i=1.

(1) Find any path from the source node to the sink node that has a strictly positive flow capacity remaining. If there are no more paths, exit.

(2) Determine $f_i$. The maximum flow along this path, which will be equal to the smallest flow amount on any edge in the path (the bottleneck edge).

(3) Store this path as Path$_i$ with flow amount $f_i$.

(4) Subtract $f_i$ from the remaining flow capacity in the forward direction for each edge in the path. Add $f_i$ to the remaining flow capacity in the backwards direction for each edge in the path.

(5) Set i=i+1. Go to step (1).

Construct the parallel path set over the reduced network.
(0) i=1.
(1) Find the highest path from the source node to the sink node, which is higher than all other edges in the network. If there are no more paths, exit. The steps for finding the highest path are:
  i. Initializing, set the virtual edge In(u) as $e_i$ and the source node u as t.
  ii. Let $e_i$ be the start edge. Find the closest output edge $e_o$ from the edge set Out(t) according to the clockwise order at node t. Store $e_i$, $e_o$ and t.
  iii. If the edge $e_o$=Out(d), exit. Otherwise, set $e_i=e_o$, t=Endnode($e_o$) and go back to step (ii).
(2) Determine $f_i$, which is the maximum flow along this path, which will be equal to the smallest flow amount on any edge in the path (the bottleneck edge).
(3) Store this path as Path, with flow amount $f_i$. Subtract $f_i$ from the remaining flow amount for each edge in the path. Delete the edges with 0 flow amount.
(4) set i=i+1. Go to step (1).

Assign the message bits to different network links for correct delivery. Meanwhile, the desired secrecy is obtained by assignment.

Figure 12:
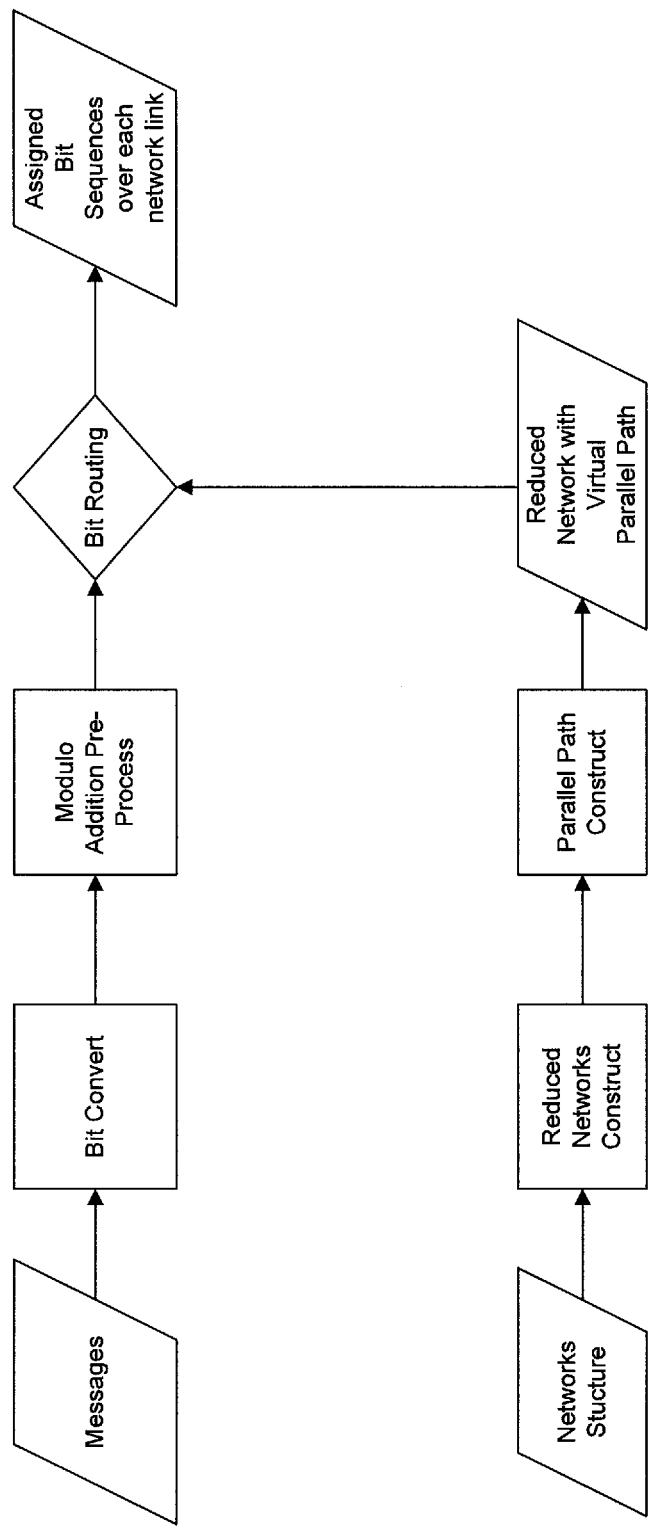
FIG. 12 shows a diagram illustrating a summary of the flow of design approach.

In FIG. 12 there is shown a diagram illustrating a summary of the flow of design approach.

B. Security and Throughput Analysis

The above summarized approach results in some specific security and throughput rates. We can analytically describe it with a rate equivocation region, characterized as the following:

Theorem 2: ($R_c$, $R_p$, $R_{e,io}$), (i,o)∈E, is achievable if there exist auxiliary numbers $r_{io}$ such that $$0 \leq r_{io} \leq R_c + R_p;$$

$$0 \leq R_{e,io} \leq R_c;$$

$$R_c + R_p \leq \min_{cut} \sum_{(i,o) \in (IO)_{cut}^l} r_{io};$$

$$r_{io} \leq C_{io};$$

$$R_{e,io} \leq R_c + R_p - r_{io}.$$

This achievable rate equivocation region is obtained through the previous approach. By lack of secrecy constraint, the main result reduces to the following, which is an alternative expression of the max-flow min-cut theorem.

$$0 \leq r_{io} \leq R_c + R_p;$$

$$r_{io} \leq C_{io};$$

$$R_c + R_p \leq \min_{cut} \sum_{(i,o) \in (IO)_{cut}^l} r_{io};$$

The interesting and practically significant case is when perfect secrecy is achieved against non-cooperating eavesdropping, i.e., $R_{e,io}=R_c$. Under this situation, the rate region is constrained by $$0 \leq R_c + R_p \leq \min_{cut} \sum_{(i,o) \in (IO)_{cut}^l} r_{io};$$

$$r_{io} \leq C_{io};$$

$$R_c = R_{e,io} \leq R_c + R_p - r_{io}.$$

This can be further simplified as $$0 \leq R_c + R_p \leq \min_{cut} \sum_{(i,o) \in (IO)_{cut}^l} \min(C_{io}, R_p).$$

C. Extension to Node Eavescropping

The proposed approach deals with the case that the eavesdropper listens to each communication link in the network. This invention also can include the extension to the case that the eavesdropper listens to the nodes in the network. Again, we can analytically describe it with a rate equivocation region characterized as the following:

Theorem 3: ($R_c$, $R_p$, $R_{e,r}$), r∈V is achievable if there exist auxiliary numbers $r_{io}$ such that (i,o)∈E and $$0 \leq r_{io} \leq R_c + R_p;$$

$$0 \leq R_{e,r} \leq R_c;$$

$$R_c + R_p \leq \min_{cut} \sum_{(i,o) \in (IO)_{cut}^l} r_{io};$$

$$r_{io} \leq C_{io};$$

$$R_{e,r} \leq R_c + R_p - \sum_{(i,o) \in (IO)_{cut}^l} r_{io}.$$

1.3 Sample Embodiments

A small sample of embodiments that are set forth herein include the following: A1. A method for secure communication over networks where each link or node is subject to non-cooperative eavesdropping. The method involves the design of encoding, decoding, and bit routing for communication over a network comprising the steps of: (a) Manipulate the messages bits by modulo addition, (b) Construct the virtual parallel path set of the network for bits transmission. A2. A system consisting of interconnected nodes in which two nodes need to communicate securely with each other via other nodes that serve as relays in the presence of an eavesdropper at an unknown location. A3. A method for secure and reliable communication when the links are subject to eavesdropping or outage or byzantine threat. A4. A system consisting of interconnected nodes in which two nodes need to communicate with each other securely and reliably via other nodes that serve as relays in the presence of an eavesdropper at an unknown location and/or link outage and/or byzantine nodes. A5. A distributed storage or secret sharing system in which each storage unit or trustee is subject to wiretapping or theft threat.

1.4 Proof of Theorem 2

Figure 13:
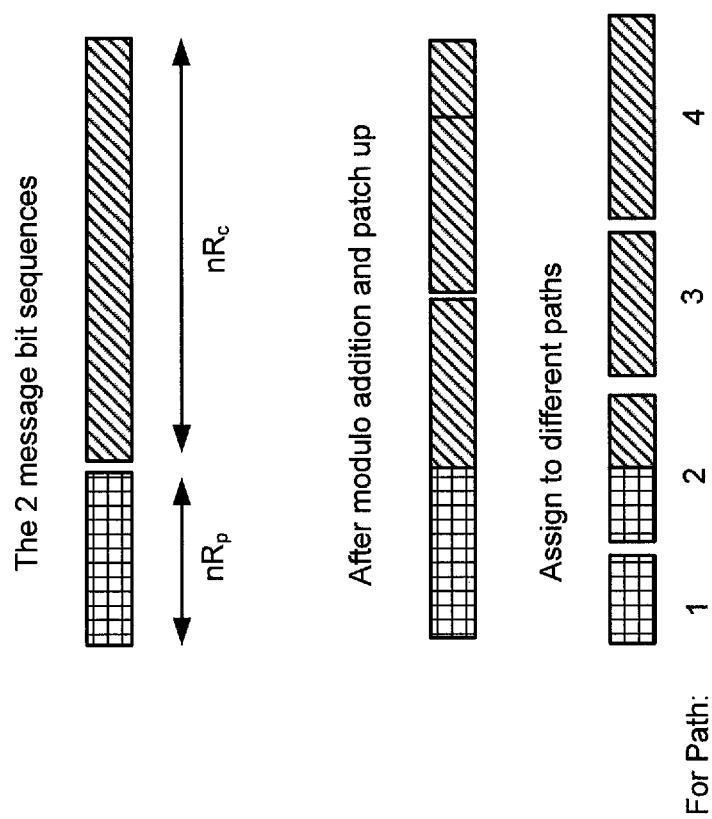
FIG. 13 shows a bit processing illustration diagram.

To prove the achievability of Theorem 2, we would discuss the detailed encoder-decoder as the following steps, as illustrated in FIG. 13.
1. Convert the uniform distributed messages S and T into binary bit sequences $b_1, b_2, \ldots b_{nR_c}$ and $k_1, k_2, \ldots k_{nR_c}$, where each bit is i.i.d. Bernoulli(½).

2. Pre-process the confidential and public message bits by modulo addition operator.

3. Assign the message bits to different network links for correct delivery. Meanwhile the desired secrecy is obtained by assignment.

In FIG. 13 there is shown a bit processing illustration diagram.

Step (2): By modulo add the two binary sequences together and patch up the proceed sequences, we get a bit sequence, $$\{c_1, c_2, \ldots, c_{nR_c+nR_p}\} = \{k_1, k_2, \ldots, k_{nR_p}, b_1 \oplus k_1, b_2 \oplus k_2, \ldots, b_{nR_p} \oplus k_{nR_p}, b_{nR_p+1} \oplus k_1, b_{nR_p+2} \oplus k_2, \ldots, b_{nR_c+nR_p} \oplus k_{mod\{nR_c, nR_p\}}\}$$

Where, $k_{mod\{nR_c, nR_p\}=0} = k_{nR_p}$.

This sequence has the following property:

Lemma 1: Any continuous segment with length r of the bit sequence:

$c_j, c_{j+1}, \ldots, c_{j+r-1}$, means the conditional entropy is $$H(b_1, b_2, b_{nR_c} | c_j, c_{j+1}, \ldots, c_{j+r-1}) = \min\{nR_c, nR_c + nR_p - r\}.$$

Step (3): Some definitions of network are first given. Next we will define the order of two paths.

For convenience, we introduce a virtual edge In(u) terminating at the source node u and a virtual edge Out(d) flowing out of the sink node d, as illustrated in FIG. 3.3.

Definition 4: Path A is higher than Path B iff for any node t shared by A,B, the input and output edges of A,B at node t are clockwise ordered as $\{A_i, A_o, B_o, B_i\}$. Conversely, Path A is lower than Path B iff the edges are ordered as $\{B_i, B_o, A_o, A_i\}$. Path A and B are crossover if Path A is neither higher nor lower than Path B.

Figure 14:
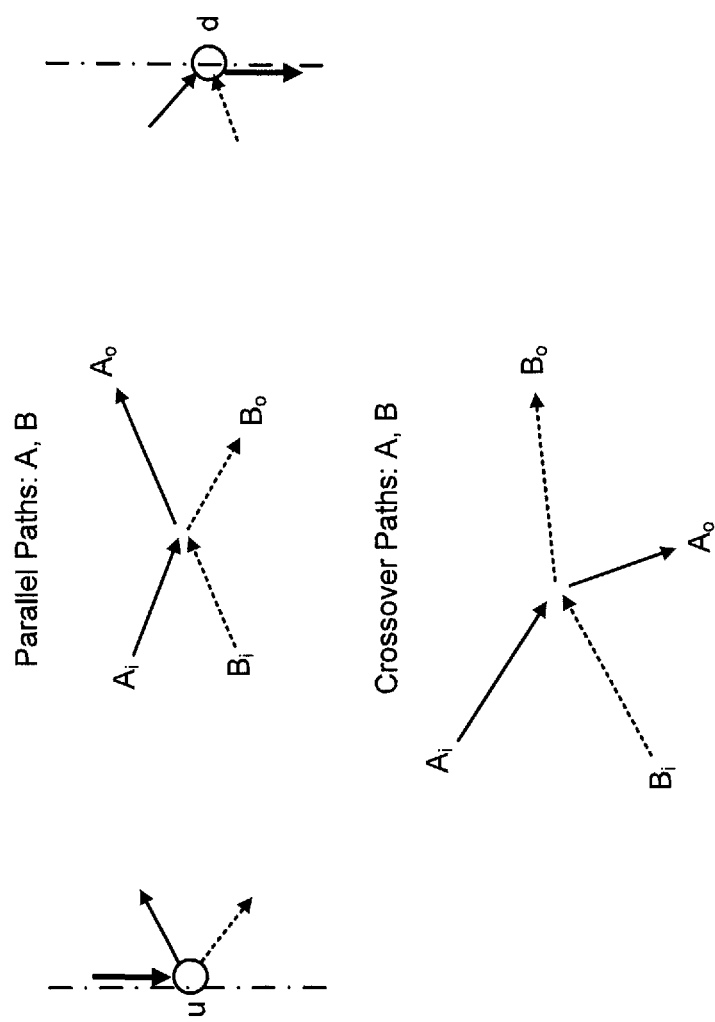
FIG. 14 shows diagrams illustrating examples for parallel and crossover path, where bold arrows at nodes u and d are In(u) and Out(d) respectively.

The examples are shown in FIG. 14.

Definition 5: Edge e=(i, o) is higher than a path A iff there exists a path B in network, which contains the edge e and is higher than A.

In FIG. 14 there are shown diagrams illustrating examples for parallel and crossover path, where the purple arrows are In(u) and Out(d) respectively.

With the above definitions, we have the following lemmas, which will be proved later.

Lemma 2: An ordered path set (from the highest path to the lowest path) can be constructed for information flow if the information amount is no more than the min-cut value. The ordered path set means there exists no crossover path pair in the set.

Lemma 3: Only the paths with successive order can share the same edge, i.e., $Path_i$, $Path_k$ can not share any edge which is not contained in $Path_j$, with i<j<k.

Now we can assign the bit sequence $\{c_1, c_2, \ldots, c_{nR_c+nR_p}\}$ to the ordered path set successively, according to Lemma 2.

Then, by Lemma 3, it can be shown that what flows on each edge $(i,o) \in E$ would be a continuous segment of the bit sequence, saying $c_j, c_{j+1}, \ldots, c_{j+nr'-1}$, where $r_{io}' \leq r_{io}$.

By Lemma 1, $\min\{nR_c, nR_c+nR_p-nr_{io}'\} \geq \min\{nR_c, nR_c+nR_p-nr_{io}\}$ bits secrecy can be obtained.

To summarize, our encoding/decoding/bit assignment process obtains the desired security.

Then this completes the achievability proof of our theorem. However it is still not clear if our approach is optimal.

A. Proof of Lemma 2

To prove Lemma 2, an iterative process is applied to construct an ordered path set. This method is a modified version of the Ford-Fulkerson original process for finding network capacity. Its main idea is to carefully bookkeep the flows assigned to ordered paths from the source node to the sink node. First of all, we assume the flow amounts assigned to the edges are already determined to achieve the flow capacity as the Ford-Fulkerson process. The steps in the method are dealing with this reduced network.

Figure 15:
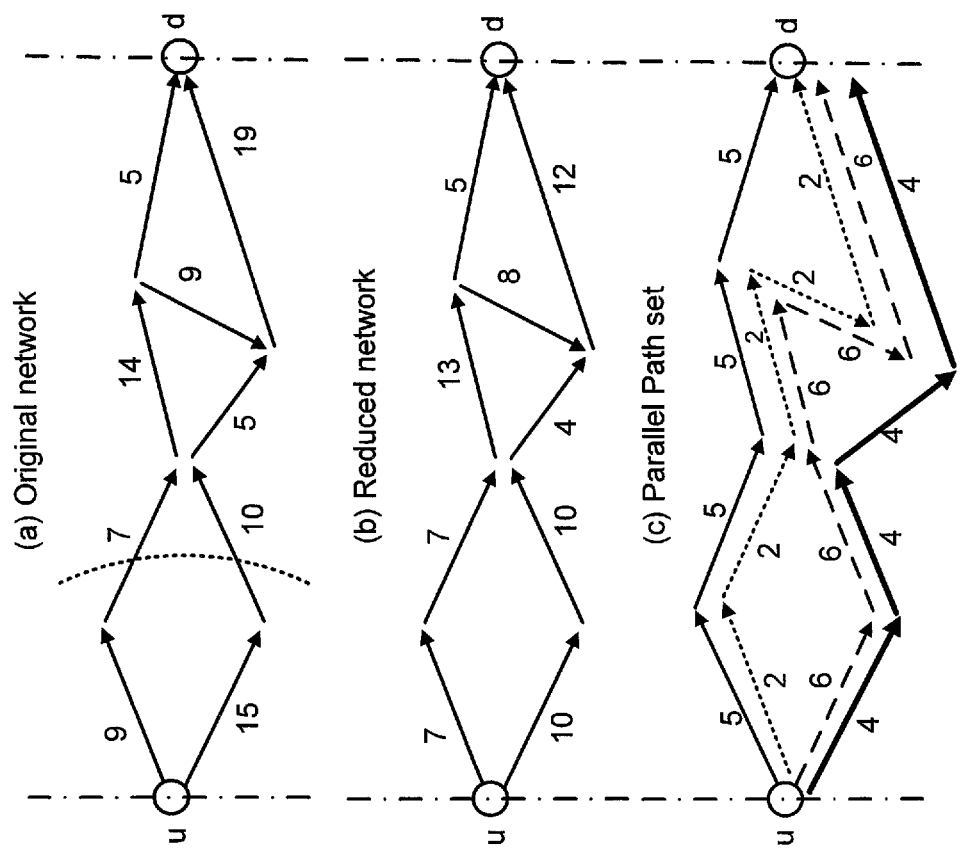
FIG. 15 shows diagrams for illustrating how to construct parallel path set for a network transmission.

In FIG. 15 there are shown diagrams for illustrating how to construct parallel path set for a network transmission.

Construct the parallel path set over the reduced network.

(0) i=1.

(1) Find the highest path from the source node to the sink node, which is higher than all other edges in the network. If there are no more paths, exit. The steps for finding the highest path:

i. Initializing, set the virtual edge In(u) as $e_i$, and the source node u as t.

ii. Let $e_i$ be the start edge, find the closest output edge $e_o$ from the edge set Out(t) according to the clockwise order at node t. Store $e_i$, $e_o$ and t.

iii. If the edge $e_o$=Out(d), exit. Otherwise, set $e_i = e_o$, t=Endnode($e_o$) and go back to step (ii).

(2) Determine $f_i$, the maximum flow along this path, which will be equal to the smallest flow amount on any edge in the path (the bottleneck edge).

(3) Store this path as Path, with flow amount $f_i$. Subtract $f_i$ from the remaining flow amount for each edge in the path. Delete the edges with 0 flow amount.

(4) Set i=i+1. Go to step (1).

This completes the proof of Lemma 2.

B. Proof of Lemma 3

Proof by contradiction is used to prove Lemma 3. Assume that Lemma 3 is wrong and $Path_i$, $Path_k$ can share one edge e which is not contained in $Path_j$ with i<j<k. Then e is higher than $Path_j$ since $Path_i$ containing edge e is higher than $Path_j$. On the other hand, e is lower than $Path_j$ as $Path_k$ is lower than $Path_j$. Thus e is contained in $Path_j$, which contradict the assumption.

[End of excerpt of U.S. Provisional Patent Application No. 61/185,434 with minor formatting and editorial changes].

A skilled artisan would appreciate the fact that the network topologies shown in the drawings have been chosen for illustration purposes; any other network topologies providing the necessary connectivity between the components depicted in the drawings, are understood to be within the scope of this invention.

A small sample of systems methods and apparatus that are described herein is as follows:

A1. A method for securely communicating a message from a source node to a destination node over a network interconnecting a plurality of computers, said method comprising:

(i) converting said message into a first bit sequence, said converting performed by one or more computers of said plurality of computers;

(ii) pre-processing said first bit sequence by a modulo adding said first bit sequence with an auxiliary key message, said pre-processing performed by one or more computers of said plurality of computers;

(iii) constructing a reduced network, said constructing a reduced network performed by one or more computers of said plurality of computers;

(iv) determining a multitude of paths from said source node to said destination node over said reduced network, said determining performed by one or more computers of said plurality of computers;

(v) constructing a second bit sequence, said second bit sequence comprising said first bit sequence and said auxiliary key message, said constructing a second bit sequence performed by one or more computers of said plurality of computers;

(vi) splitting said second bit sequence into two or more parts, said splitting performed by one or more computers of said plurality of computers;

(vii) transmitting said two or more parts of said second bit sequence over two or more paths of said multitude of paths, said transmitting performed by one or more computers of said plurality of computers;

(viii) re-assembling said two or more parts of said second bit sequence at said destination node, said re-assembling performed by one or more computers of said plurality of computers; and (ix) recovering said first bit sequence by modulo adding said second bit sequence with said auxiliary key message, said recovering performed by one or more computers of said plurality of computers.

A2. The method of A1, wherein said auxiliary key message is randomly generated at said source node.

A3. The method of A1, wherein said steps (i), (ii), (iii), (iv), (v), (vi), and (vii) are performed by a group of interconnected computers of said plurality of computers, said group of interconnected computers comprising one or more computers of said plurality of computers.

A4. The method of A1, wherein said steps (i), (ii), (iii), (iv), (v), (vi), and (vii) are performed by a first group of interconnected computers of said plurality of computers, said first group of interconnected computers comprising one or more computers of said plurality of computers; and wherein said steps (viii) and (ix) are performed by a second group of interconnected computers, said second group of interconnected computers comprising one or more computers of said plurality of computers.

A5. The method of A1, wherein at least one link in said network is subject to eavesdropping.

A6. The method of A1, wherein said step of constructing a reduced network is performed by identifying a multitude of paths achieving the maximum flow over the network.

A7. The method of A1, wherein said step of determining a multitude of paths from said source node to said destination node over said reduced network is performed by recurrently identifying a highest path from said source node to said destination node.

A8. The method of A1, wherein said step of splitting said bit sequence into two or more parts is performed using at least one of: a pre-determined size of said two or more parts, a randomly selected size of said two or more parts.

A9. The method of A1, wherein said step of transmitting two or more parts of a bit sequence over two or more paths of said multitude of paths comprises the step of successively assigning each part of said bit sequence to a path of said multitude of paths.

B1. A method for securely communicating a message from a source node to a destination node over a network comprising:
converting said message into a bit sequence;
pre-processing said bit sequence;
constructing a reduced network;
determining a multitude of paths from said source node to said destination node over said reduced network;
splitting said bit sequence into two or more parts;
transmitting said two or more parts of said bit sequence over two or more paths of said multitude of paths; and
re-assembling said two or more parts of said bit sequence at said destination node.

B2. The method of B1, wherein said pre-processing includes pre-processing by a modulo addition operator.

B3. The method of B1, wherein at least one link in said network is subject to eavesdropping.

B4. The method of B1, wherein said step of constructing a reduced network is performed by identifying a multitude of paths achieving the maximum flow over the network.

B5. The method of B1, wherein said step of determining a multitude of paths from said source node to said destination node over said reduced network is performed by recurrently identifying a highest path from said source node to said destination node.

B6. The method of B1, wherein said step of splitting said bit sequence into two or more parts is performed using at least one of: a pre-determined size of said two or more parts, a randomly selected size of said two or more parts.

B7. The method of B1, wherein said step of transmitting two or more parts of a bit sequence over two or more paths of said multitude of paths comprises the step of successively assigning each part of said bit sequence to a path of said plurality of paths.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. A method for securely communicating a message from a source node to a destination node over a network interconnecting a plurality of computers, said method comprising:
converting said message into a bit sequence, said converting performed by one or more computers of said plurality of computers;
pre-processing said bit sequence, the pre-processing comprising modifying the bit sequence based on an auxiliary key message to obtain a resulting bit sequence, the pre-processing performed by one or more computers of said plurality of computers;
constructing a reduced network, said constructing a reduced network performed by one or more computers of said plurality of computers;
determining an ordered multitude of paths from said source node to said destination node over said reduced network by determining a plurality of parallel paths identified based on ordering input and output edges of nodes of the network, said determining performed by one or more computers of said plurality of computers, wherein determining the plurality of parallel paths comprises determining a highest path from the source node to the destination node, wherein a first path is higher that a second path based on, for each node shared by the first path and the second path, the input edge and output edge ($A_1$ and $A_2$, respectively) of the first path and the input edge and output edge ($B_1$ and $B_2$, respectively) of the second path being clockwise ordered as $A_1, A_2, B_2, B_1$;
combining the resulting bit sequence with the auxiliary key message to form an expanded bit sequence;
splitting said expanded bit sequence into two or more parts, said splitting performed by one or more computers of said plurality of computers; and
transmitting said two or more parts of said expanded bit sequence over two or more paths of said ordered multitude of paths, said transmitting performed by one or more computers of said plurality of computers.

2. The method of claim 1, wherein said converting, pre-processing, constructing, determining, combining, splitting, and transmitting are performed by a group of interconnected computers of said plurality of computers, said group of interconnected computers comprising one or more computers of said plurality of computers.

3. The method of claim 1, wherein said converting, pre-processing, constructing, determining, combining, splitting, and transmitting are performed by a first group of interconnected computers of said plurality of computers, said first group of interconnected computers comprising one or more computers of said plurality of computers; and
wherein the method further comprises re-assembling the two or more parts of the expanded bit sequence at the destination node, said re-assembling performed by a second group of interconnected computers, said second group of interconnected computers comprising one or more computers of said plurality of computers.

4. The method of claim 1, wherein at least one link in said network is subject to eavesdropping.

5. The method of claim 1, wherein said constructing the reduced network is performed by identifying a multitude of paths achieving a maximum flow over the network.

6. The method of claim 1, wherein said determining of the ordered multitude of paths from said source node to said destination node over said reduced network is performed by: identifying the highest path from said source node to said destination node, determining a smallest flow on any edge in the highest path, subtracting the determined smallest flow from a remaining flow capacity in the forward direction for each edge in the highest path, and repeating the identifying, the determining the smallest flow capacity, and the subtracting for at least one next highest path from the source node to the destination node.

7. The method of claim 1, wherein said splitting of said expanded bit sequence into two or more parts is performed using at least one of a pre-determined size of said two or more parts, or a randomly selected size of said two or more parts.

8. The method of claim 1, wherein said transmitting the two or more parts of the expanded bit sequence over the two or more paths of said ordered multitude of paths comprises the successively assigning each part of the two or more parts of said expanded bit sequence to a respective path of said ordered multitude of paths.

9. The method of claim 1, wherein the modifying comprises modulo adding the auxiliary key message and the bit sequence to obtain the resulting bit sequence.

10. A method for securely communicating a message from a source node to a destination node over a network, the method comprising:
converting said message into a bit sequence;
pre-processing said bit sequence, the pre-processing comprising modifying the bit sequence based on an auxiliary key message to obtain a resulting bit sequence;
constructing a reduced network;
determining an ordered multitude of paths from said source node to said destination node over said reduced network by determining a plurality of parallel paths identified based on ordering input and output edges of nodes of the network, wherein determining the plurality of parallel paths comprises determining a highest path form the source node to the destination node, wherein a first path is higher than a second path based on, for each node shared by the first path and the second path, the input edge and output edge ($A_1$ and $A_2$, respectively) of the first path and the input edge and output edge ($B_1$ and $B_2$, respectively) of the second path being clockwise ordered as $A_1, A_2, B_2, B_1$;
combining the resulting bit sequence with the auxiliary key message to form an expanded bit sequence;
splitting said expanded bit sequence into two or more parts; and
transmitting said two or more parts of said expanded bit sequence over two or more paths of said ordered multitude of paths.

11. The method of claim 10, wherein said auxiliary key message is randomly generated at said source node.

12. The method of claim 10, wherein the modifying comprises modulo adding the auxiliary key message and the bit sequence to obtain the resulting bit sequence.

13. The method of claim 10, wherein at least one link in said network is subject to eavesdropping.

14. The method of claim 10, wherein said constructing the reduced network is performed by identifying a multitude of paths achieving a maximum flow over the network.

15. The method of claim 10, wherein said determining the multitude of paths from said source node to said destination node over said reduced network comprises:
identifying highest path from said source node to said destination node;
determining a smallest flow on any edge in the highest path;
subtracting the determined smallest flow from a remaining flow capacity in the forward direction for each edge in the highest path; and
repeating the identifying, the determining the smallest flow capacity, and the subtracting for at least one next highest path from the source node to the destination node.

16. The method of claim 10, wherein said splitting said bit sequence into two or more parts is performed using at least one of: a pre-determined size of said two or more parts, or a randomly selected size of said two or more parts.

17. The method of claim 10, wherein said transmitting the two or more parts of the expanded bit sequence over the two or more paths of said ordered multitude of paths comprises the successively assigning each part of the two or more parts of said expanded bit sequence to a respective path of said ordered multitude of paths.

18. The method of claim 10, wherein the method further comprises re-assembling the two or more parts of the expanded bit sequence at the destination node.

19. The method of claim 10, wherein at least two paths of the ordered multitude of paths share a common node other than the source node and the destination node.

20. The method of claim 10, wherein the modifying comprises modulo adding the auxiliary key message and the bit sequence to obtain the resulting bit sequence.

* * * * *

UNITED STATES PATENT AND TRADEMARK OFFICE
CERTIFICATE OF CORRECTION

PATENT NO.        : 8,671,277 B2                                    Page 1 of 1
APPLICATION NO.   : 12/797409
DATED             : March 11, 2014
INVENTOR(S)       : Xu et al.

It is certified that error appears in the above-identified patent and that said Letters Patent is hereby corrected as shown below:

In the Claims

Column 16, Line 53:   Claim 1, Delete "$A_1$ and $A_2$" and insert -- $A_i$ and $A_o$ --

Column 16, Line 55:   Claim 1, Delete "$B_1$ and $B_2$" and insert -- $B_i$ and $B_o$ --

Column 16, Line 56:   Claim 1, Delete "$A_1$, $A_2$, $B_2$, $B_1$" and insert -- $A_i$, $A_o$, $B_o$, $B_i$ --

Column 18, Line 5:    Claim 10, Delete "$A_1$ and $A_2$" and insert -- $A_i$ and $A_o$ --

Column 18, Line 6:    Claim 10, Delete "$B_1$ and $B_2$" and insert -- $B_i$ and $B_o$ --

Column 18, Line 8:    Claim 10, Delete "$A_1$, $A_2$, $B_2$, $B_1$" and insert -- $A_i$, $A_o$, $B_o$, $B_i$ --

Signed and Sealed this
Third Day of June, 2014

Michelle K. Lee
*Deputy Director of the United States Patent and Trademark Office*